United States Patent
Potok et al.

(10) Patent No.: US 9,558,185 B2
(45) Date of Patent: Jan. 31, 2017

(54) METHOD AND SYSTEM TO DISCOVER AND RECOMMEND INTERESTING DOCUMENTS

(71) Applicant: UT-Battelle LLC, Oak Ridge, TN (US)

(72) Inventors: Thomas Eugene Potok, Oak Ridge, TN (US); Chad Allen Steed, Oak Ridge, TN (US); Robert Matthew Patton, Knoxville, TN (US)

(73) Assignee: UT-Battelle LLC, Oak Ridge, TN (US)

( * ) Notice: Subject to any disclaimer, the term of this patent is extended or adjusted under 35 U.S.C. 154(b) by 202 days.

(21) Appl. No.: 13/737,652

(22) Filed: Jan. 9, 2013

(65) Prior Publication Data

US 2014/0032539 A1  Jan. 30, 2014

Related U.S. Application Data (60) Provisional application No. 61/584,965, filed on Jan. 10, 2012.

(51) Int. Cl.
*G06F 17/30* (2006.01)

(52) U.S. Cl.
CPC ... *G06F 17/30011* (2013.01); *G06F 17/30675* (2013.01); *G06F 17/30864* (2013.01)

(58) Field of Classification Search
CPC ..................................................... G06F 17/30
See application file for complete search history.

(56) References Cited

U.S. PATENT DOCUMENTS

| | | | |
|---|---|---|---|
| 5,950,189 A * | 9/1999 | Cohen | G06F 17/3069 |
| 6,542,889 B1 | 4/2003 | Aggarwal et al. | |
| 6,990,628 B1 | 1/2006 | Palmer et al. | |
| 7,225,183 B2 | 5/2007 | Gardner | |
| 7,693,903 B2 | 4/2010 | Potok et al. | |
| 7,805,446 B2 | 9/2010 | Potok et al. | |
| 7,844,566 B2 | 11/2010 | Wnek | |
| 7,937,389 B2 | 5/2011 | Jiao et al. | |

(Continued)

FOREIGN PATENT DOCUMENTS

| | | | | |
|---|---|---|---|---|
| WO | WO 2010014082 A1 * | 2/2010 | ....... | G06F 17/30675 |
| WO | 2011/099982 | 8/2011 | | |

OTHER PUBLICATIONS

Reed et. al, "TF-ICF: A New Term Weighting Scheme for Clustering Dynamic Data Streams", Proceedings of the 5th International Conference on Machine Learning and Applications, ICMLA 2006.*

(Continued)

*Primary Examiner* — Etienne Leroux
(74) *Attorney, Agent, or Firm* — Warner Norcross & Judd LLP (57) ABSTRACT

Disclosed are several examples of systems that can read millions of news feeds per day about topics (e.g., your customers, competitors, markets, and partners), and provide a small set of the most relevant items to read to keep current with the overwhelming amount of information currently available. Topics of interest can be chosen by the user of the system for use as seeds. The seeds can be vectorized and compared with the target documents to determine their similarity. The similarities can be sorted from highest to lowest so that the most similar seed and target documents are at the top of the list. This output can be produced in XML format so that an RSS Reader can format the XML. This allows for easy Internet access to these recommendations.

18 Claims, 4 Drawing Sheets

(56) References Cited

U.S. PATENT DOCUMENTS

| | | | |
|---|---|---|---|
| 7,958,136 B1 | 6/2011 | Curtis et al. | |
| 2003/0154071 A1* | 8/2003 | Shreve | G06F 17/2845 |
| | | | 704/9 |
| 2007/0130100 A1* | 6/2007 | Miller | G06F 17/30014 |
| 2007/0185871 A1* | 8/2007 | Canright | G06F 17/30864 |
| 2009/0070325 A1 | 3/2009 | Gabriel et al. | |
| 2009/0132566 A1* | 5/2009 | Ochi | G06F 17/2241 |
| 2011/0196870 A1 | 8/2011 | Schmidtler et al. | |
| 2014/0337337 A1* | 11/2014 | Chen | G06F 17/3069 |
| | | | 707/736 |

OTHER PUBLICATIONS

Gaussier, E., J.-M. Renders, I. Matveeva, C. Goutte, H. Dejean, "A Geometric View on Bilingual Lexicon Extraction from Comparable Corpora," Proceedings of the 42nd Annual Meeting of the Association for Computational Linguistics, pp. 527-534.

Strasberg, Howard R., Christopher D. Manning, Thomas C. Rindfleisch, Kenneth L. Melmon, "What's related? Generalizing Approaches to Related Articles in Medicine," in AMIA Symposium, 2000, pp. 838-842.

* cited by examiner

METHOD AND SYSTEM TO DISCOVER AND RECOMMEND INTERESTING DOCUMENTS

CROSS-REFERENCE TO RELATED APPLICATIONS

This application claims the benefit of U.S. Provisional Patent Application Ser. No. 61/584,965, entitled "A Process to Recommend and Discover Interesting On-Line Documents", filed Jan. 10, 2012, which is herein incorporated by reference in its entirety.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

BACKGROUND OF THE INVENTION

1. Field of the Invention

The present disclosure relates to document searching and more specifically to a system and method of identifying relevant documents.

2. Description of the Related Art

One method of searching for electronic documents online is by entering one or more keywords into a search engine, such as a search engine webpage on the Internet. In general, the quality of such a search depends on the skill of the user and their ability to craft and submit an appropriate query. There are some systems that can return results from a keyword search and offer to find more documents based on a given result. If someone was interested in several different topics, they may need to spend a significant amount of time searching for and reviewing documents that may meet the search criteria, but may not be of any real interest.

Earlier works by Potok et al., address the need for automated document searching and the following three references are incorporated by reference as if included here at length. Potok et al., Agent-based method for distributed clustering of textual information, U.S. Pat. No. 7,805,446; Potok et al., Method for gathering and summarizing internet information, U.S. Pat. No. 7,693,903; and Jiao and Potok, Dynamic reduction of dimensions of a document vector in a document search and retrieval system, U.S. Pat. No. 7,937,389.

Further improvements can advance the state of the art.

BRIEF SUMMARY OF THE INVENTION

The system and method includes searching with a set of multiple seed documents, rather than one or more keywords or a single seed document. The disclosed system and method can find target documents that are similar to the seed documents, and return the results. The results can be sorted and recommendations can be made.

This system and method is capable of comparing a large number of target documents to multiple seed documents chosen by a user to determine which target documents are relevant to user. Recommendations of target documents can be made based on the similarity of the individual seed documents to the target documents. That is, the individual seed document vectors and their similarity to the target documents are preserved.

Disclosed is a method for discovering documents, i.e. on-line documents, using a computer and bringing them to the attention of a human observer. A computer may be programmed with a series of instructions that, when executed, cause the computer to perform a series of method steps. The method steps may include: defining a set of multiple seed documents of interest; processing each seed document, i.e. by removing stop words and stemming the terms; generating seed document vectors; obtaining target document vectors, i.e. retrieving one or more target documents and generating a target document vector or receiving a predetermined target document vector; comparing each target document vector to each seed document vector, i.e. by using a dot product of the two vectors to represent the similarity of the terms within the seed document and the target document to obtain a similarity value; sorting by the similarity values, i.e. creating similarity tuples including a seed document identifier, a target document identifier, and a similarity value between the two and sorting the similarity tuples from highest similarity value to lowest similarity value; and recommending one or more target documents based on the sorted values, i.e. displaying information about the sorted data for the human observer.

A system for discovering documents, i.e. on-line documents, for a human observer is also disclosed. The system may include a computer with a storage device, a processor, an input device, and a display device. The computer obtains a set of multiple seed documents from the input device, processes each seed document by removing the stop words and stemming the terms, generates a seed document vector for each seed document, obtains a target document vector, i.e. retrieves one or more target documents and generates a target document vector for each target document, compares the target document vector to the seed document vector to obtain a similarity value, i.e. using a dot product of the two vectors to represent the similarity of the terms within the seed document and target document, sorts by the similarity values from highest to lowest with the processor, and displays the similarity values for the human observer on the monitor.

BRIEF DESCRIPTION OF THE SEVERAL VIEWS OF THE DRAWINGS

A more complete understanding of the preferred embodiments will be more readily understood by reference to the following detailed description when considered in conjunction with the accompanying drawings where like numerals indicate common elements among the various figures.

DETAILED DESCRIPTION OF THE INVENTION

Figure 3:
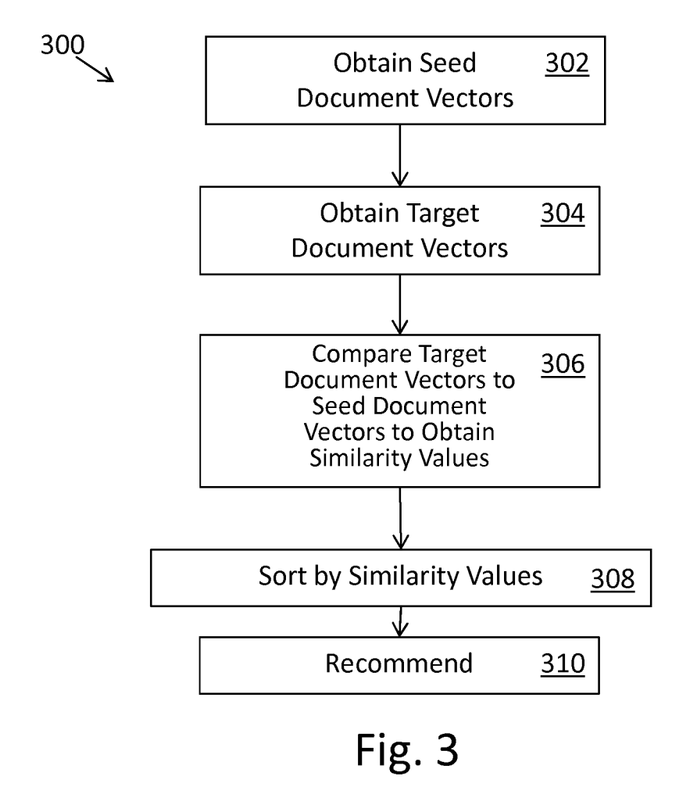
FIG. 3 is a flowchart in accordance with an example system and method of the present invention.

One embodiment of a method of the present invention is described in connection with the flowchart 300 illustrated in FIG. 3. The method for discovering and recommending interesting documents includes obtaining a seed document vector for each of a plurality of seed documents 302, obtaining a target document vector for each of a plurality of target documents 304, comparing each target document vector to each seed document vector to obtain a similarity value for each comparison 306, sorting by the similarity values 308, and recommending one or more target documents based on the sorted results 310.

A document vector is a mathematical representation of the term frequencies of a document. For example, a document vector can be represented by a list of words and the number of times each word appears in the document. Seed documents are the documents of interest upon which a search is performed. Target documents are the documents that make up the pool of documents that are being searched. Seed document vectors and target document vectors refer to the document vectors of the seed documents and the document vectors of the target documents, respectively.

In some embodiments, seed document vectors and target document vectors can be generated. In such embodiments where document vectors are generated, the steps of obtaining seed document vectors 302 or obtaining target document vectors 304 may include obtaining documents, processing the documents, and generating the document vectors.

Documents can be obtained from essentially any source and the way in which a user obtains documents can vary from application to application. For example, seed documents or target documents can be obtained from the Internet, or another database. In one example, ten publicly available research papers can be used as a set of seed documents, i.e. documents of interest chosen by the user of the system. These seed documents can be downloaded to a local computing machine, converted to text files, and stored on a local computing machine. The documents may be stored in a local or remote database. Although ten seed documents were chosen in this example, additional or fewer documents can be used as the plurality of seed documents. In one embodiment, documents may be scanned using a scanner and processed with optical character recognition software.

As another example, the system and method may include gathering a collection of target documents to be searched. For example, the target documents can be obtained from the Internet or other sources, such as a database. The source of the documents may be static, meaning that no additional documents are added over time, or may be dynamic, meaning that documents may be added or deleted from the source over time. For example, target documents can be obtained from one or more Really Simple Syndication ("RSS") feeds. In one embodiment, the target documents include several thousand RSS feeds as the source. In one example, these entries were downloaded to a local computing machine and stored in a local database.

The content of the documents can vary from application to application. For example, seed documents can be related or unrelated to one another. That is, the seed documents may include a plurality of documents with disparate subject matter relative to one another, a plurality of documents with similar subject matter relative to one another, or a combination of some seed documents with disparate subject matter relative to other seed documents and some seed documents with similar subject matter relative to other seed documents. As another example, the target documents can be related to a certain topic, be derived from a particular source or set of sources, or be a random sampling of publicly available documents, for example, target documents available on the Internet.

Before generating a document vector, the documents may undergo some processing. For example, in one embodiment, the system iterates through each of the seed documents, performing a number of steps, including the removal of stop words and the stemming of terms. Then, after processing, the document vector can be generated for each seed document.

Essentially any method for generating a document vector can be utilized. In the current embodiment, a document vector can be generated for a document using the Term Frequency/Inverse Corpus Frequency (TFICF) method, as disclosed in U.S. Pat. Nos. 7,693,903 and 7,805,446, which were incorporated by reference above. In alternative embodiments a document vector can be generated using a different method.

In another embodiment, predetermined seed document vectors and target document vectors can be received. Generating document vectors may be unnecessary, for example, if they have already been generated previously. Document vectors, either seed document vectors or target document vectors, can be received by retrieving them from memory. For example, a database of document vectors may be available. The database may be available internally in memory of the computer handling the search or alternatively may be available externally in memory of a different system.

Some embodiments can include a combination of receiving predetermined document vectors and generating document vectors. For example, in some embodiments, predetermined target document vectors are received and seed document vectors are generated. In other embodiments, some target document vectors and/or seed document vectors are generated and some predetermined target document vectors and/or predetermined seed document vectors are received.

The similarity between a seed document and a target document can be ascertained by comparing the seed document vector and the target document vector. This can also be referred to as a search. Perhaps the comparison can be best understood in connection with FIG. 1, which illustrates a representative flow diagram 100.

Figure 1:
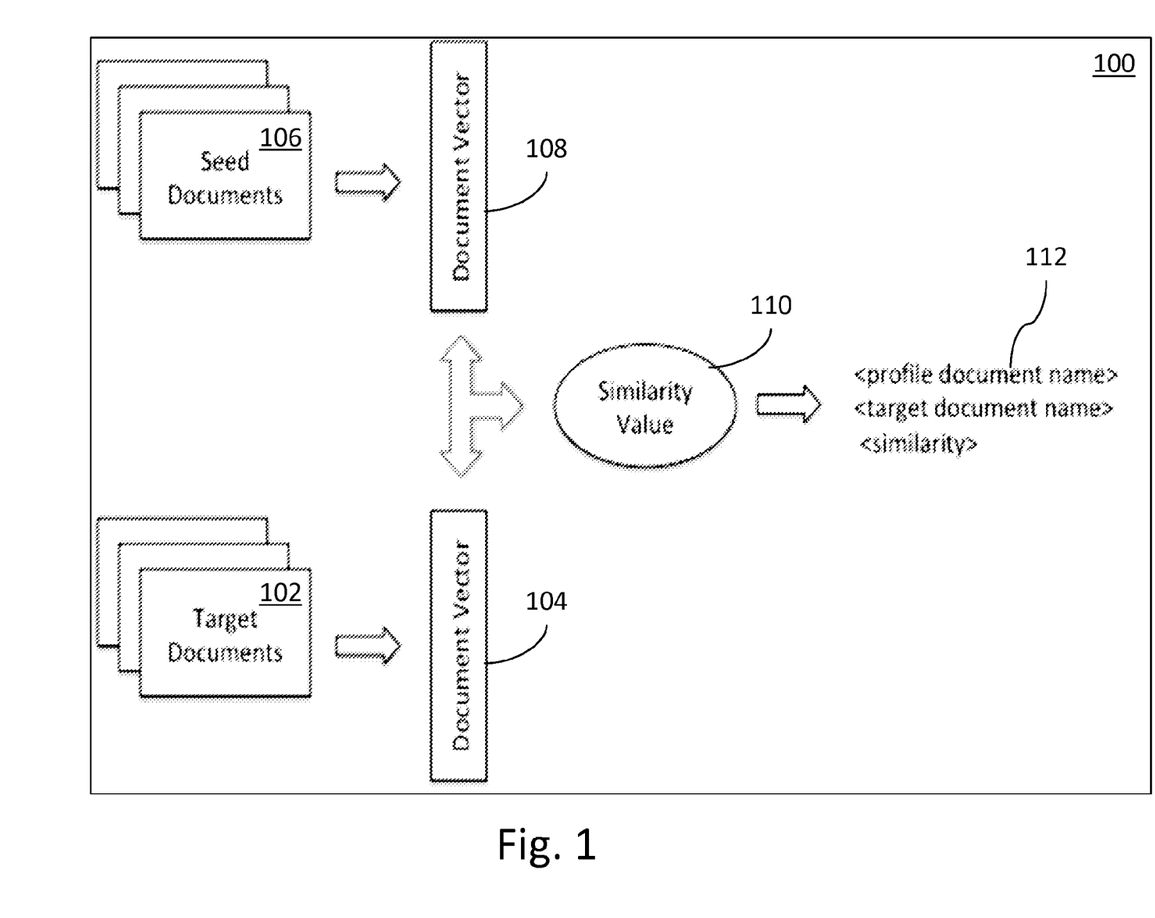
FIG. 1 is a flow diagram in accordance with an example system and method of the present invention.

Referring to FIG. 1, an embodiment that includes generating seed document vectors and target document vectors, the system retrieves a single target document 102 and creates a target document vector 104 for that document. The system also retrieves a single seed document 106 and creates a seed document vector 108 for that document. The first target document vector 104 is then compared to the first seed document vector 108 using a dot product of the two vectors to represent the similarity 110 of the terms within the two documents. The result can be recorded as a similarity tuple 112 including <profile document name or ID>, <target document name or ID>, and <similarity>.

This process can be iterated to generate a similarity tuple for every combination of target document and seed document. For example, with three seed documents and 1000 target documents, the process can generate 3000 similarity tuples—one tuple for every combination of seed document and target document.

The order of the comparisons can vary. For example, the target document vector can be compared to each of the remaining seed document vectors, for example where there are ten seed documents there would be nine remaining seed documents, and the similarities tuples can be recorded for those comparisons. At that stage, one target document has been compared to all of the seed documents. Each of the remaining target documents may then be compared to each of the ten seed document vectors, and the similarities tuples can be recorded for each comparison. Now, all of the target documents have been compared to all of the seed documents, and the results recorded. In another embodiment, each seed document vector could be taken in turn and compared to every target document before moving to the next.

The results of the comparison can be sorted based on the similarity values. For example, in embodiments where similarity tuples are recorded, the similarity tuples can be sorted based on the similarity values from highest to lowest, so that the similarity tuple with the most similar seed and target documents are at the top of the list. This can simplify the review by the user or a piece of software of the most relevant document for each of the seed documents. In alternative embodiments, the results can be sorted differently. For example, the results can be sorted in reverse, from lowest similarity value to highest similarity value.

Recommendations of target documents are made based on the similarity of the individual seed documents to the target documents as opposed to recommendations based on the similarity of a collection of seed documents to the target documents. That is, the individual seed document vectors and their similarity to the target documents can be preserved.

Figure 2:
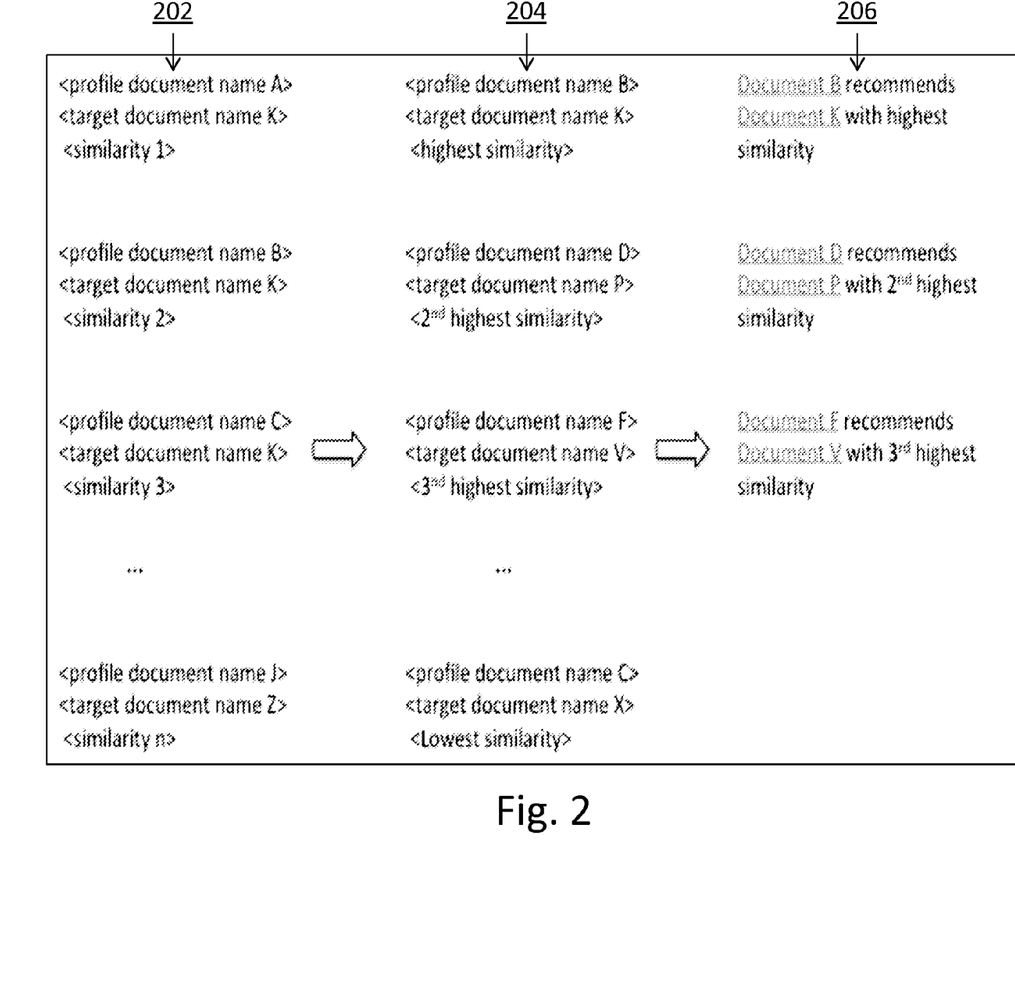
FIG. 2 is a flow diagram in accordance with an example system and method of the present invention.

Recommendations based on the search can be provided to a user. For example, the system can recommend a certain target document that is similar to a certain seed document. In one embodiment, the recommendation can include displaying on a computer monitor a filtered list of sorted similarity tuples. Such an approach is illustrated in FIG. 2. A list of unsorted similarity tuples 202 are shown being sorted into a list of sorted similarity tuples from highest similarity value to lowest similarity value 204. The list of sorted similarity tuples 204 is shown being formatted into a recommendation 206 including a list of the three similarity tuples with the highest similarity values. The recommendation 206 is in the form <seed document name> recommends <target document name> at similarity <similarity>. Thus one of the seed documents is "recommending" a target document with an indication of the similarity ranking.

Although the embodiment illustrated in FIG. 2 recommends the three similarity tuples with the three highest similarity values, in alternative embodiments, the system can provide a recommendation by filtering or otherwise organizing the results differently in order to identify interesting target documents that are similar to a seed document. For example, the results can be filtered to provide a certain number of the highest similarity tuples for each seed document, instead of a certain number of the highest similarity tuples regardless of the originating seed document.

The recommendation or output can be produced in a variety of different formats. For example, the output can be produced in XML format so that an RSS Reader can format the XML. This can allow for easy Internet access to the recommendations. As another example, the recommendation can be provided in a text file.

Figure 4:
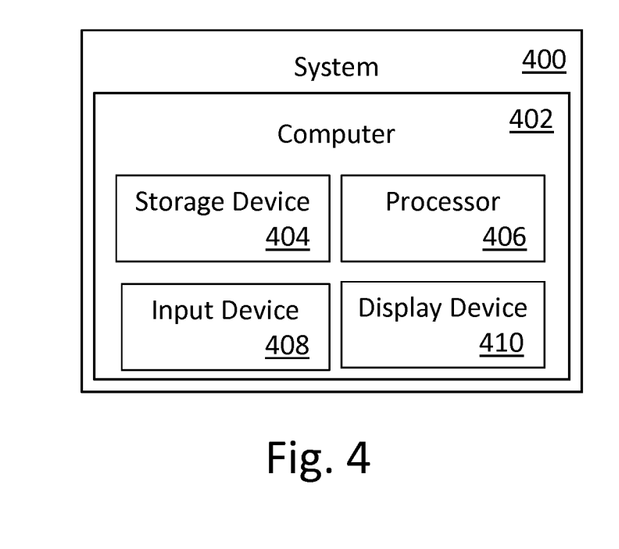
FIG. 4 is a system diagram in accordance with an example system and method of the present invention.

Referring to FIG. 4, a computer apparatus 402 is part of a system 400 used to execute a series of commands representing the method steps described above. The computer 402 may be a mainframe, a super computer, a PC or Apple Mac personal computer, a hand-held device, a smart phone, or another central processing unit known in the art. The computer 402 is programmed with a series of instructions that, when executed, cause the computer 402 to perform the method steps as described and claimed in this application. The instructions that are performed are stored on a machine-readable data storage device 404. In the illustrated embodiment, the computer 402 includes a processor 406, input device 408, and a display device 410.

The machine-readable, non-transitory data storage device can be a portable memory device that is readable by the computer apparatus. Such portable memory device can be a compact disk (CD), digital video disk (DVD), a Flash Drive, any other disk readable by a disk driver embedded or externally connected to a computer, a memory stick, or any other portable storage medium currently available or yet to be invented. Alternately, the machine-readable data storage device can be an embedded component of a computer such as a hard disk or a flash drive of a computer.

The computer and machine-readable data storage device can be a standalone device or a device that is imbedded into a machine or system that uses the instructions for a useful result. The computer may be part of a larger system or network of connected computers.

While this disclosure describes and enables several examples of a system and method for recommending and discovering interesting documents, other examples and applications are contemplated. Accordingly, the invention is intended to embrace those alternatives, modifications, equivalents, and variations as fall within the broad scope of the appended claims. The technology disclosed and claimed herein is available for licensing in specific fields of use by the assignee of record.

What is claimed is:

1. A method for recommending interesting documents to a user using a computer, the method comprising:

selecting a plurality of seed documents for initiating a document search of a plurality of target documents different from the seed documents;

obtaining a seed document vector for each of the plurality of seed documents, each seed document having a seed document identifier;

obtaining a target document vector for each of the plurality of target documents, each target document having a target document identifier;

comparing each target document vector to each seed document vector to obtain a document similarity value for each comparison, the document similarity value representing the similarity of the terms within the seed document and target document;

recording in memory a similarity tuple for each document similarity value, where each similarity tuple includes: 1) the document similarity value, 2) the seed document identifier of the seed document used in that comparison, and 3) the target document identifier of the target document used in that comparison, whereby a similarity tuple is generated for every combination of seed document and target document;

sorting the plurality of similarity tuples by the document similarity values to generate an ordered list of similarity tuples, whereby the relationship between the seed document, target document, and document similarity value is preserved for each similarity tuple within the ordered list; and generating and displaying a plurality of recommendations of target documents based on the ordered list of similarity tuples, wherein each recommendation specifies a seed document, a target document, and the document similarity value, whereby the relationship between the seed document, target document, and document similarity value is preserved in each recommendation provided to the user.

2. The method of claim 1 wherein obtaining a target document vector for each of the plurality of target documents includes receiving the plurality of target documents from an electronic, RSS feed and generating the target document vector for each of the plurality of target documents received from the electronic, RSS feed.

3. The method of claim 1 wherein obtaining a target document vector for each of the plurality of target documents includes receiving the plurality of target documents, processing the plurality of target documents by removing stop words and stemming terms, and generating the target document vector for each processed target document.

4. The method of claim 3 wherein generating the target document vector for each processed target document includes generating the target document vector using the TFICF method.

5. The method of claim 1 wherein obtaining a target document vector for each of a plurality of target documents includes receiving a predetermined target document vector for at least some of the plurality of target documents.

6. The method of claim 1 wherein obtaining a seed document vector for each of the plurality of seed documents includes receiving the plurality of seed documents, processing the plurality of seed documents by removing stop words and stemming terms, and generating the seed document vector for each processed seed document.

7. The method of claim 6 wherein generating the seed document vector for each processed seed document includes generating the seed document vector using the TFICF method.

8. The method of claim 1 wherein comparing each target document vector to each seed document vector to obtain the similarity value for each comparison includes comparing each target document vector to each seed document vector using a dot product of the vectors to represent the similarity of the terms within the seed document and target document.

9. A method for discovering documents using a computer and bringing them to the attention of a human observer, the computer being programmed with a series of instructions that, when executed, cause the computer to perform the method steps comprising:
 defining a plurality of seed documents of interest for the document discovery;
 processing each seed document by removing the stop words and stemming the terms;
 generating a seed document vector for each seed document;
 receiving a plurality of target documents and generating a target document vector for each target document;
 comparing each of the target document vectors to each of the seed document vectors using a dot product of the two vectors to represent the similarity of the terms within the seed document and target document to obtain a document similarity value;
 recording in memory a similarity tuple for each document similarity value, where each similarity tuple includes: 1) the document similarity value, 2) the seed document used in that comparison, and 3) the target document used in that comparison, whereby a similarity tuple is generated for every combination of seed document and target document;
 sorting the plurality of similarity tuples according to the document similarity values to generate an ordered list of similarity tuples, whereby the relationship between the seed document, target document, and document similarity value is preserved for each similarity tuple within the ordered list; and
 generating and displaying a plurality of recommendations of target documents based on the ordered list of similarity tuples, wherein each recommendation specifies a seed document, a target document, and the document similarity value, whereby the relationship between the seed document, target document, and document similarity value is preserved in each recommendation provided to the human observer.

10. The method of claim 9 wherein sorting the similarity tuples includes:
 sorting the similarity tuples from highest to lowest based on the document similarity value in the similarity tuple.

11. The method of claim 9 wherein receiving one or more target documents and generating a target document vector for each target document includes receiving one or more target documents from an electronic, RSS feed and generating the target document vector for each of the one or more target documents received from the electronic, RSS feed.

12. The method of claim 9 wherein generating the target document vector for each target document includes generating the target document vector using the TFICF method.

13. The method of claim 9 wherein generating the seed document vector for each seed document includes generating the seed document vector using the TFICF method.

14. A system for discovering on-line documents for a human observer, the system comprising:
 a computer having a storage device, a processor, an input device for obtaining a plurality of seed document vectors and a plurality of target document vectors, and a display device; and
 wherein the processor performs a method comprising:
  comparing each of the plurality of target document vectors to each of the plurality of the seed document vectors to obtain a document similarity value;
  recording in memory a similarity tuple for each document similarity value, where each similarity tuple includes: 1) the document similarity value, 2) an identifier of the seed document vector used in that comparison, and 3) an identifier of the target document vector used in that comparison, whereby a similarity tuple is generated for every combination of seed document vector and target document vector;
  sorting the similarity tuples by document similarity values to generate an ordered list of similarity tuples, whereby the relationship between the seed document vector, target document vector, and document similarity value is preserved for each similarity tuple within the ordered list, and
  generating and displaying a plurality of recommendations of target documents based on the ordered list of similarity tuples, wherein each recommendation identifies an identifier corresponding to a seed document vector, an identifier corresponding to a target document vector, and the document similarity value between the seed document vector and the target document vector, whereby the relationship between the seed document vector, target document vecotr, and document similarity value is preserved in each recommendation,
 wherein the display device displays the plurality of recommendations for the human observer on the display device.

15. The method of claim 14 wherein obtaining a plurality of target document vectors includes receiving a plurality of target documents from an electronic, RSS feed and generating the plurality of target document vectors based on the plurality of target documents received from the electronic, RSS feed.

16. The method of claim 14 wherein obtaining a plurality of seed document vectors includes receiving a plurality of seed documents, processing the plurality of seed documents by removing stop words and stemming terms, and generating the seed document vector for each processed seed document.

17. The method of claim 16 wherein generating the seed document vector for each processed seed document includes generating the seed document vector using the TFICF method.

18. The method of claim 14 wherein comparing each target document vector to each seed document vector to obtain the similarity value for each comparison includes comparing each target document vector to each seed document vector using a dot product of the vectors to represent the similarity of the terms within the seed document and target document.

* * * * *